United States Patent [19]
Lindsay et al.

[11] Patent Number: 6,017,590
[45] Date of Patent: Jan. 25, 2000

[54] TIP COATING SYSTEM FOR SCANNING PROBE MICROSCOPY

[75] Inventors: Stuart M. Lindsay; Tianwei Jing; Yuri L. Lyubchenko, all of Tempe, Ariz.; Alexander A. Gall, Bothell, Wash.

[73] Assignee: Molecular Imaging Corporation, Tempe, Ariz.

[21] Appl. No.: 08/760,757

[22] Filed: Dec. 5, 1996

Related U.S. Application Data

[62] Division of application No. 08/524,054, Sep. 6, 1995, Pat. No. 5,630,932.

[51] Int. Cl.⁷ ...................................................... B05D 1/00
[52] U.S. Cl. .................. 427/430.1; 118/404; 118/407; 118/423; 118/428; 118/429
[58] Field of Search ................................... 118/404, 407, 118/423, 428, 429; 427/430.1

[56] References Cited

U.S. PATENT DOCUMENTS

| | | | |
|---|---|---|---|
| 2,559,080 | 7/1951 | MacAllister | 41/41 |
| 3,524,803 | 8/1970 | Rannefeld | 204/142 |
| 4,375,396 | 3/1983 | Green et al. | 204/129.55 |
| 4,806,755 | 2/1989 | Duerig et al. | 250/306 |
| 4,868,396 | 9/1989 | Lindsay | 250/440.1 |
| 4,968,390 | 11/1990 | Bard et al. | 204/15 |
| 5,035,780 | 7/1991 | Suzuki et al. | 204/129.35 |
| 5,085,746 | 2/1992 | Musselman et al. | 204/129.4 |
| 5,120,959 | 6/1992 | Tomita | 250/306 |
| 5,145,564 | 9/1992 | Lemke et al. | 204/129.55 |
| 5,155,361 | 10/1992 | Lindsay | 250/307 |
| 5,178,742 | 1/1993 | Lemke et al. | 204/129.55 |
| 5,202,004 | 4/1993 | Kwak et al. | 204/153.1 |
| 5,258,107 | 11/1993 | Yoshida et al. | 204/129.55 |
| 5,286,355 | 2/1994 | Fainchtein et al. | 204/129.55 |
| 5,336,369 | 8/1994 | Kado et al. | 156/659.1 |
| 5,345,815 | 9/1994 | Albrecht et al. | 73/105 |
| 5,345,816 | 9/1994 | Clabes et al. | 73/105 |
| 5,348,638 | 9/1994 | Nakagawa | 205/122 |
| 5,353,632 | 10/1994 | Nakagawa | 73/105 |
| 5,354,985 | 10/1994 | Quate | 250/234 |
| 5,356,218 | 10/1994 | Hopson et al. | 374/124 |
| 5,357,109 | 10/1994 | Kusumoto | 250/306 |
| 5,360,978 | 11/1994 | Gueret | 250/306 |
| 5,381,101 | 1/1995 | Bloom et al. | 324/676 |
| 5,382,456 | 1/1995 | Hocking et al. | 118/423 |
| 5,438,206 | 8/1995 | Yokoyama et al. | 250/424.11 |
| 5,461,907 | 10/1995 | Tench et al. | 73/105 |
| 5,468,959 | 11/1995 | Tohda et al. | 250/306 |
| 5,481,521 | 1/1996 | Washizawa et al. | 369/99 |
| 5,497,000 | 3/1996 | Tao et al. | 250/307 |

FOREIGN PATENT DOCUMENTS

| | | | |
|---|---|---|---|
| 6-59004 | 3/1994 | Japan | 33/2 |

OTHER PUBLICATIONS

Bezanilla, et al., "Adsorption of DNA to Mica, Silylated Mica, and Minerals: Characterization by Atomic Force Microscopy," Langmuir, vol. II, No. 2, 1995, pp. 655–659.

Booth, et al., "Silica–supported Cyclopentadienyl–Rhodium (I),–Cobalt (I), and –Titanium (IV) Complexes," Journal of Organometallic Chemistry, 315 (1986), pp. 143–156.

(List continued on next page.)

*Primary Examiner*—Laura Edwards
*Attorney, Agent, or Firm*—Killworth, Gottman, Hagan & Schaeff, L.L.P.

[57] ABSTRACT

A tip coating system for use with scanning tunneling microscope (STM) tips. The tip coating system includes a tip holder, a plate having a slot for receiving the tip and for holding a coating material, a heater for heating the coating material into a molten blob, a micropositioner for displacing the plate to and from the tip and for moving the tip within the slot so that selected portions of the tip contact the molten blob of coating material. The tip coating system is preferably controlled by electronic controllers, including a temperature controller for the heater. The tip coating system is used to insulate the tips with soft polymer coating material to ensure very low tip leakage current (on the order of about 1 pA typical).

17 Claims, 5 Drawing Sheets

OTHER PUBLICATIONS

Chalmers, et al., "Determination of tilted superlattics structure by atomic force microscopy," Applied Physics Letters 55(24), Dec. 1989, pp. 2491–2492.

Cricenti, et al., "Preparation and characterization of tungsten tips for scanning tunneling microscopy," Rev. Sci. Instrum. 65(5), May 1994, pp. 1558–1560.

Damaskin, et al., "The Adsorption of Organic Molecules," Institute of Electrochemistry, Academy of Sciences of the USSR, pp. 353–395.

DeRose, et al., "Comparative scanning probe microscopy study of the surface morphology of Au films grown from the vapor onto glass, fused silica and muscovite mica," Journal of Vacuum Science Technology, A 11 (4), Jul./Aug. 1993, pp. 776–780.

Fried, et al., "Gold–coated tungsten tips for scanning tunneling microscopy," Rev. Sci. Instrum. 64(6), Jun. 1993, pp. 1495–1497.

Frisbie, et al., "Functional Group Imaging by Chemical Force Microscopy," Science, vol. 265, Sep. 30, 1994, pp. 2071–2074.

Gorbunov, et al., "The use of silver tips in scanning tunneling microscopy," Rev. Sci. Instrum. 64 (8), Aug. 1993, pp. 2393–2394.

Hansma, et al., "Atomic force microscopy of DNA in aqueous solutions," Nucleic Acids Research, vol. 21, No. 3, 1993 pp. 505–512.

Huang, et al., "Experimental method for preparing nanometer scale Pd probe," Rev. Sci. Instrum. 64 (10), Oct. 1993, pp. 3022–3023.

Ibe, et al., "On the electrochemical etching of tips for scanning tunneling microscopy," Journal Vacuum Science Technology, A, vol. 8, No. 4, Jul./Aug. 1990, pp. 3570–3575.

Jarvis, et al., "A Novel Force Microscopy and Point Contact Probe," Dec. 1993, Rev. Sci. Instrum., vol. 64, No. 12, pp. 3515–3520.

Joyce, et al., "Mechanical Relaxation of Organic Monolayer Films Measured by Force Microscopy," Physical Review Letters, vol. 68, No. 18, May 4, 1992, pp. 2790–2793.

Lemke, et al., "Improved microtips for scanning probe microscopy," Rev.Sci. Instrum. 61 (10) Oct. 1990, pp. 2538–2541.

Lindsay, et al., "Scanning Tunneling Microscopy and Atomic Force Microscopy Studies of Biomaterials at a Liquid–Solid Interface," Jul./Aug. 1993, Journal Vacuum Science Technology, vol. 11, No. 4, pp. 808–815.

Lyubchenko, et al., "A technique for stable adhesion of DNA to a modified graphite surface for imaging by scanning tunneling microscopy," J. Va. Sci. Technol. B9(2) Mar./Apr. 1991, pp. 1288–1290.

Lyubchenko, et al., "Atomic Force Microscopy Imaging of Double Stranded DNA and RNA," Journal of Biomolecular Structure & Dynamics, vol. 10, issue No. 3 (1992) pp. 589–606.

Lyubchenko, et al., "Atomic force microscopy of reovirus dsRNA: a routine technique for length measurements," Nucleic Acids Research, vol. 20, No. 15 (1992) pp. 3983–3986.

Lyubchenko, et al., "Atomic force microscopy of DNA and bacteriophage in air, water and propanol: the role of adhesion forces," Nucleic Acids Research, vol. 21, No. 5 (1993), pp. 1117–1123.

Lyubchenko, et al., "Atomic force microscopy of long DNA: Imaging in air and under water," Proc. Natl., Acad. Sci. USA, vol. 90, Mar. 1993, pp. 2137–2140.

Lyubchenko, et al., "Atomic force microscopy imaging of large double stranded DNA molecules," The FASEB Journal, vol. 6, No. 1, Jan. 1, 1992, pp. 855–856.

Melmed, "The art and science and other aspects of making sharp tips," Journal Vacuum Science Technology, B 9 (2), Mar./Apr. 1991, pp. 601–608.

Musselman, et al., "Platinum/iridium tips with controlled geometry for scanning tunneling microscopy," Journal Vacuum Science Technology, A. vol. 8, No. 4, Jul./Aug. 1990, pp. 2558–2562.

Nagahara, et al., "Preparation and characterization of STM tips for electrochemical studies," Rev. Sci. Instrum., 60 (10), Oct. 1989, pp. 3128–3130.

Plueddermann, Edwin P., "Silane Coupling Agents," Plenum Press, 2nd edition, pp. cover–xi.

Rees, et al., "Evidence of DNA Bending in Transcription Complexes Imaged by Scanning Force Microscopy," Science, vol. 260, Jun. 11, 1994, pp. 1646–1649.

Schuelr, et al., "Creating and observing surface features with a scanning tunneling microscope," SPIE vol. 897, Scanning Microscopy Technologies and Applications (1988), pp. 16–19.

Sonnenfield, et al., "Semiconductor topography in aqueous environments: Tunneling microscopy of chemomechanically polised (001) GaAs," Appl. Phys. Letters 50 (24), Jun. 15, 1987, pp. 1742–1744.

Steitz, et al., "Structural studies of protein–nucleic acid interaction: the sources of sequence–specific binding," Quarterly Reviews of Biophysics 23, 3 (1990), pp. 205–280.

Stewart, et al., "Use of Magnetic Forces to Control Distance in a Surface Force Apparatus," Meas. Sci. Technol. (1990), vol. 1, pp. 1301–1303.

Thundat, et al., "Atomic Force Microscopy of DNA on MICA and Chemically Modified MICA," Scanning Microscopy, vol. 6, No. 4 (1992) pp. 911–918.

West, et al., "Chemical applications of scanning tunneling microscopy," IBM J. Res. Develop., vol. 30, No. 5, Sep. 1986, pp. 484–490.

Yang, et al., "Atomic force microscopy on DNA molecules," Federation of European Biochemical Societies, vol. 301, No. 2, Apr. 1992, pp. 172–176.

"Tips and Substrates for Scanning Probe Microscopy," corrected, Jul. 19, 1995.

TIP COATING SYSTEM FOR SCANNING PROBE MICROSCOPY

CROSS-REFERENCES TO RELATED APPLICATIONS

This application is a division of U.S. patent application Ser. No. 08/524,054, filed Sep. 6, 1995 in the names of inventors Stuart M. Lindsay, Tianwei Jing, Yuri L. Lyubchenko and Alexander A. Gall, entitled, "Tips and Substrates for Scanning Probe Microscopy, now U.S. Pat. No. 5,630,932, issued May 20, 1997.

BACKGROUND OF THE INVENTION

1. Field of the Invention

This invention relates to a tip and substrate preparation system for use with scanning probe microscopes (SPMs) comprising a tip maker, methods for coating scanning tunneling microscope (STM) tips for electrochemical use, a substrate treatment method for producing clean, flat gold substrates for STM use and methods for preparing chemically activated substrates for use with an atomic force microscope (AFM). The tip maker includes a coater and an etcher which are preferably controlled by electronic controllers. The etcher provides fully automatic tip etching in a two-stage process in sodium hydroxide (NaOH) solution, permitting platinum alloys to be etched without the use of cyanide-containing chemicals. The coater is used to insulate the tips with soft polymer coatings so as to ensure very low tip leakage current (on the order of about 1 pA typical). The substrate treatment device comprises a quartz plate and a quartz torch for annealing substrates in a hydrogen flame. The chemically activated substrates for atomic force microscopy permit the surface of mica to be modified at will so as to be hydrophobic, hydrophilic, positively or negatively charged.

2. The Prior Art

The probe tip is the most critical element in a scanning tunneling microscope. It is usually made from a tungsten (W) or a Platinum-Iridium Alloy (Pt—Ir) wire. The sharpness and stability of the tip affects the quality and resolution of the STM image of the surface directly. In recent prior art (see, e.g., I. H. Musselman, et al., "Platinum/iridium tips with controlled geometry for scanning tunneling microscopy", Journal of Vacuum Science and Technology, Vol. A 8(4), pp. 3558–3562, 1990; J. P. Ibe, et al., "On the electrochemical etching of tips for scanning tunneling microscopy", Journal of Vacuum Science and Technology, Vol. A 8(4), pp. 3570–3575, 1990; and A. Cricenti, et al., "Preparation and characterization of tungsten tips for scanning tunneling microscopy", Review of Scientific Instruments, Vol. 65, No. 5, pp. 1558–1560, May, 1994), tips are prepared by electrochemical etching of W or Pt—Ir wires. For imaging in ambient and fluid environments, a W tip suffers from the formation of an oxide layer on its surface. Pt—Ir alloy is thus preferred because of its relative chemical inertness. However, making Pt—Ir tips formerly involved the use of a solution containing sodium cyanide (NaCN), an extremely toxic and regulated chemical which, aside from being dangerous, presents onerous requirements for use which are difficult to conveniently meet in a typical university or industrial laboratory setting. Other methods for etching Pt—Ir tips include the use of $CaCl_2/H_2O/$ concentrated HCl solution and molten salts. Such methods require a relatively long etching time (on the order of about 20 minutes about minutes) and a complex mixture of chemicals. As will be seen shortly, these problems are solved by the present invention.

There are two commonly used methods for preparing Pt—Ir tips: (1) one step drop-off method, and (2) two step bulk etching/micropolishing method. The first method is summarized in the article of L. A. Nagahara et al., "Preparation and characterization of STM tips for electrochemical studies", Review of Scientific Instruments, Vol. 60, No. 10, pp. 3128–3130, October, 1989. The basic setup consists of a beaker containing an electrolyte (typically 3 M NaCN and 1 M NaOH) and a vertical adjustment to control the depth of immersion of a platinum (Pt) alloy wire (usually Pt—Ir). A piece of Pt—Ir wire is dipped into the electrolyte near the center of the beaker using the vertical adjust. The length of the immersed part of Pt—Ir wire is adjusted to give an initial etching current value of 0.5 A. A circular nickel (Ni) foil placed in the beaker is used as counterelectrode. During the etching process, the section at the air-solution interface and the extreme lower end of the wire are etched much faster. Thus, when the neck of the wire near the interface becomes thin enough, it is fractured by the weight of the wire in the electrolyte. The etching is terminated when the lower part of the wire drops off. The most important parameter affecting the final shape of the tip end is the time delay in removing the applied voltage after the lower part drops off. An electronic circuit is often used to sense the abrupt decrease of the etching current which accompanies the drop-off. It then turns off the applied voltage after a preset delay. However, reproducible tip shapes are nearly impossible to achieve because of the noise level in the current due to fluctuations associated with the turbulence in the fluid during etching. A second method consists of two steps: bulk etching followed by micropolishing. The bulk etching is carried out as described previously. The wire is etched in bulk solution to obtain the overall shape required and a precision micropolishing is then done in a thin film of etchant held in a wire loop so as to be positioned over the apex of the tip. The loop has to be raised and lowered with a mechanical micropositioner to achieve best tip shape. The whole process of making a tip is long and complex, requiring much practice and training. The present invention solves these problems by automating the entire etching process through a controller, which uses a phase-locked circuit to detect the etching current very accurately and terminate the etching promptly.

Obtaining a sharp tip is essential for ensuring a high quality and high resolution images of a surface, but operating an STM in electrochemical environments also requires that the STM tip be well insulated, with just a small protrusion of bare metal at the very apex of the tip. Good insulation reduces the Faradaic leakage current and, consequently, noise. An ideal tip for this environment should have a chemically and electrochemically inert insulation except for the very end of the tip, which should be uncoated to allow electron tunneling to occur. In the prior art, Glass-coated and Poly($\alpha$-methylstyrene)-coated tips have been used. However, both of these materials are brittle and non-ductile and therefore crack easily, resulting in a reduction in their insulation capabilities and an increased Faradaic current. In addition, glass-insulated tips cannot be used in concentrated alkali solutions because they will dissolve. $SiO_2$ evaporated onto glass-coated tips has also been tried with good results, but this process is time consuming and requires an expensive high vacuum coating system. In recent years, Apiezon wax has been used as an alternative insulating material and gives satisfactory results (See, e.g., L. A. Nagahara et al., supra). In recent prior art for using wax as an insulating material, an etched tip is mounted vertically on a manipulator, and brought underneath a wax holder. The tip is poked through the molten wax, brought out of the wax and tested for leakage. The typical leakage of these wax-insulated tips is about 100 pA. This process is very slow and often has the problem of damaging the apex of tips with thermal shock because the tip has a much lower temperature than the wax when it enters the wax. This problem is avoided in the present invention, both by the use of better coating methods and through the use of alternative coating materials. Furthermore, Apiezon wax is soluble in many organic solvents, such as toluene and benzene, and therefore cannot be used in non-aqueous electrochemistry. This problem is solved in the present invention as well.

A flat and clean substrate is very important for imaging biopolymers and other adsorbates under electrochemical potential control in an electrochemical scanning probe microscope (ECSPM). In recent ECSPM development, the most commonly used substrates have been gold (Au) single crystals, or Au films evaporated onto mica and annealed in an ultra high vacuum (UHV) for many hours. Fabricating such substrates requires costly setup and time consuming procedures. Furthermore, these procedures do not yield clean substrates reproducibly due to contamination when the vacuum system is first re-pressurized or opened. A reliable and easy-to-use alternative method for preparing substrates is required. Single crystals of gold or gold films evaporated onto a substrate that is stable at high temperature may be cleaned and flattened with the use of a hydrogen flame, as is well known in prior art for forming solid electrode surfaces for electrochemistry. However, neither of these surfaces produces flatness comparable to gold evaporated onto mica. It has generally been assumed that mica cannot be annealed with a hydrogen flame because it breaks down at temperatures above 500° C.

In atomic force microscopy, the substrate is not required to be conductive and mica is commonly used because it yields large atomically-flat areas easily. However, the surface of mica is rather inert, and not many materials stick to it well. It must be treated in order for it to bind many types of molecule. Lyubchenko et al., "Atomic Force Microscopy Imaging of Double Stranded DNA and RNA", Journal of Biomolecular Structure & Dynamics, Vol. 10, No. 3, pp. 589–606, 1992, have described a mica surface treatment with 3-aminopropyltriethoxy silane. This treatment binds amine groups to the mica surface. They become protonated in water to give the surface a positive charge so that it attracts negatively-charged molecules such as DNA. It would be more useful to be able to place a very reactive group onto the mica surface so that it could be modified at will so as to bind positively charged, hydrophobic, and hydrophilic molecules and molecules with specific reactive sites.

There has been rapid growth of the use of chemically functionalized AFM force-sensing probes [C. D. Frisbie et al., "Functional Group Imaging by Chemical Force Microscopy", Science, Vol. 265, pp. 2071–2074, Sep. 30, 1994]. The chemistry that is used to modify mica can also be used to modify force probes made from silicon compounds.

In short, while the microscopes for ECSPM are being developed rapidly, tip and substrate preparation systems are not generally available as efficient, easy to use laboratory tools.

OBJECTS AND ADVANTAGES OF THE INVENTION

Accordingly, it is an object of the present invention to provide a tip and substrate preparation system which is easy to use in the typical laboratory by the typical laboratory worker.

It is another object of the present invention to provide a tip maker which fully automates the tip etching process and is reliable.

It is still another object of the present invention to make a tip etcher which uses only simple, cyanide-free solutions as an etchant for platinum and platinum alloys.

It is still another object to provide a system in which a multi-stage etching processes may be carried out in same piece of equipment and make use of the same solution.

It is yet another object of the present invention to provide an efficient procedure in which the tip wires are precut into a fixed length and then mounted onto tip holders for etching, and to do so in a way that allows many tips to be etched at same time.

It is a further object of the present invention to provide an efficient, reliable, automatic way to insulate tips with films suitable for non-aqueous electrochemistry.

It is a still further object of the present invention to provide an easy-to-use and efficient way to anneal noble-metal films on mica surfaces.

It is another object of this invention to provide a method and reagents for modification of the mica surface and force-sensing probes so that various functional groups may be easily placed on the surface of the modified mica substrate for atomic force microscopy.

These and many other objects and advantages of the present invention will become apparent to those of ordinary skill in the art from a consideration of the drawings and ensuing description of the invention.

SUMMARY OF THE INVENTION

The foregoing objects have been achieved in the tip and substrate preparation system of the present invention. The systems are automated and, together, make up an easy-to-use integrated system. The components comprise a tip etcher and coater and a substrate annealing device.

According to one aspect of the invention, an automatable tip maker is provided which includes an etcher, an electronic control unit, and a tip coater.

According to another aspect of the invention, the tip etcher comprises a tip holder, a platform arm, a vertical adjustment, a glass electrolyte container and a base. The tip holder holds a tip wire vertically at lower end, suspended by the platform arm. The platform arm is supported by the vertical adjustment which sits on the base. The adjustment moves the platform arm vertically.

According to another aspect of the invention, the preferred electrolyte for etching platinum and platinum alloys is concentrated sodium hydroxide. While the lack of cyanide in this solution results in the formation of a black platinum precipitate, this has no effect upon the efficiency of the etching process for small wires.

According to another aspect of the invention, the glass electrolyte container is filled with electrolyte and sits on the base under the platform arm. It has a stainless steel counterelectrode placed inside near its edge. The tip and the counter electrode are connected to the controller through a cable.

According to another aspect of the invention, the tip wire is lowered and dipped into the electrolyte using the vertical adjustment. After this initial adjustment, tip wires are replaced by removing the tip holder to change the tip wire.

According to another aspect of the invention, the tip etch controller uses a phase-locked circuit to measure the etching current. The whole etching process is controlled in two stages automatically.

According to another aspect of the invention, the tip-coater comprises a plate attached to a heating element, a micropositioner, a vertical adjustment, a base, a temperature sensor and a temperature controller. The micropostioner on the base moves the plate horizontally. The tip holder fits into a bore on top of the vertical adjustment which moves it vertically.

According to another aspect of the invention, the heated plate has a shallow slot with a slit from the center to one side. It also has a temperature sensor mounted near the heating element. Wax or other coating material is placed in the shallow slot, and fills the slot when melted.

According to another aspect of the invention, the temperature sensor and the heating element are connected to a temperature controller. The temperature controller keeps the heated plate at a constant predetermined temperature.

According to another aspect of the invention, a tip is brought into the slot from the side with its apex kept above the wax molten wax or polymer surface. It is then lowered into the wax or polymer. After it has been completely immersed, it is brought up vertically to pierce the surface of the wax or polymer. It is then removed from the slit horizontally with its apex kept above the wax or polymer surface.

According to another aspect of the invention, the substrate treatment device comprises a hydrogen flame torch and a quartz base. The substrates are lightly annealed in hydrogen flame immediately prior to use in a scanning probe microscope. Rather unexpectedly, this method permits annealing of gold deposited on mica.

According to another aspect of the invention, a mica substrate is chemically modified with iodopropyltrimethoxysilane, leaving a reactive alkyl group attached to the surface of the mica. This is easily reacted with a number of functional groups to impart desired characteristics to the modified mica surface. In another embodiment. Alternatively, 1,1,3,3-hexamethyldisilazane may be used to treat the mica surface so as to impart hydrophobic characteristics to the mica surface.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

TIP ETCHER

Figure 1:
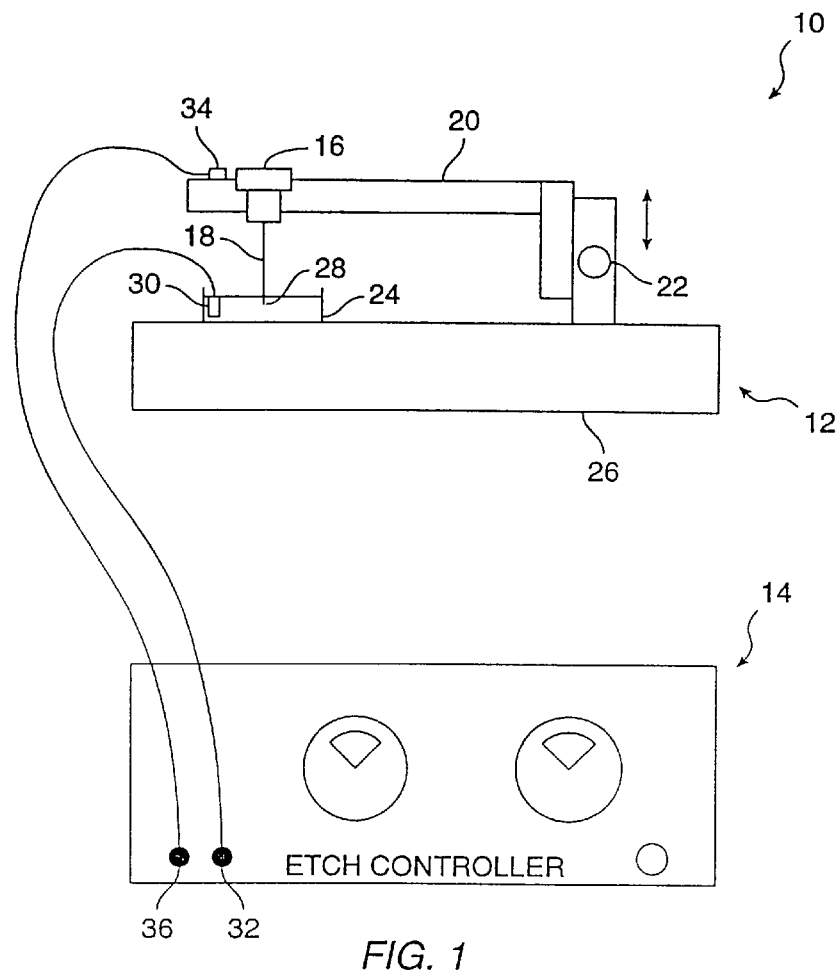
FIG. 1 is a schematic diagram of the tip etching system according to a presently preferred embodiment of the present invention.

According to the present invention in its presently preferred embodiment, the essential elements of the tip-etching system 10 are depicted in the FIG. 1. The system 10 comprises an etcher 12 and an etch controller 14. A tip holder 16 ("receiving means") into which a tip wire 18 is mounted is placed on a platform arm 20. Tip wire 18 is preferably pre-cut to a predetermined fixed length to insure tip uniformity. Arm 20 can be translated vertically by a slide-screw adjustment apparatus 22 in a conventional manner ("immersion means"). A glass petri dish 24 or similar container, filled with a liquid etching solution, sits on a platform base 26. The tip 28 of wire 18 (preferably Pt or Pt—Ir) is lowered and dipped into the etching solution in dish 24 through operation of the vertical adjustment 22. This adjustment is done on the first use of the system 10. In subsequent use, additional required adjustment is minimal because tip-wires are preferably precut to a precise fixed length. A stainless steel electrode 30 is placed inside dish 24 to serve as a counterelectrode. Electrode 30 is connected to etch controller 14 at a first output 32. A connector 34 on arm 20 is electrically connected to tip wire 18 in tip holder 16. Connector 34 is, in turn, coupled to a second output 36 of etch controller 14 to couple the tip to the etch controller 14.

According to a presently preferred embodiment of the present invention, etch controller 14 controls the electrical parameters of the etching process automatically using a set of preset parameters as will be described in detail below. It is of critical importance that one achieve the correct profile of the etched tip prior to coating. This is done by a controlled sequence of pulses applied to the tip in the etching solution. By applying bipolar pulses as described below at "TIP ETCHER OPERATION", rapid and accurate etching is obtained without the use of cyanide. In the preferred method of operation, the etching solution is sodium hydroxide at concentrations between about 8 M and about 10 M but concentrations in the range of about 1 M to about 10 M will also work. Lower concentrations will require longer immersion.

TIP COATER

Figure 2:
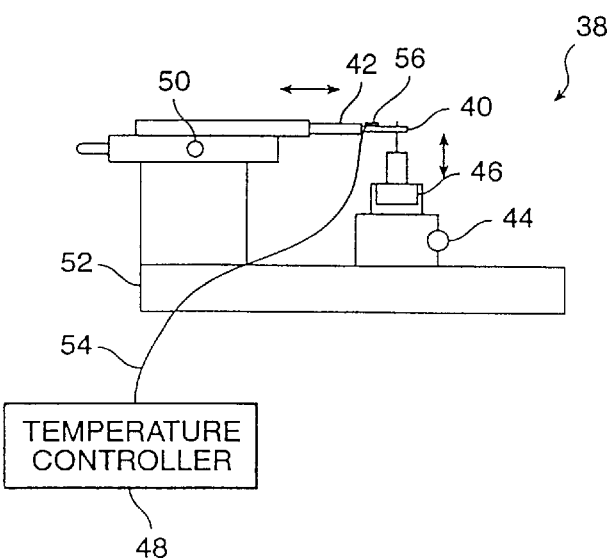
FIG. 2 is an elevational schematic diagram of the tip-coater according to a presently preferred embodiment of the present invention.

A tip coater 38 according to a presently preferred embodiment of the present invention is shown in FIG. 2 and may be used to coat a tip after etching a sharp tip onto it as described above. Tip coater 38 comprises a copper plate 40 attached to a heating element 42, a vertical adjustment control 44 on which tip holder 46 is placed, a temperature controller 48 and a micropositioner 50 which is located on base 52 which supports plate 40. Micropositioner 50 permits plate 40 to be translated horizontally. Cable 54 connects heating element 42 and a temperature sensor 56 disposed on plate 40 to temperature controller 48 which regulates the temperature of plate 40 to maintain an optimum viscosity for the coating material.

Figure 3:
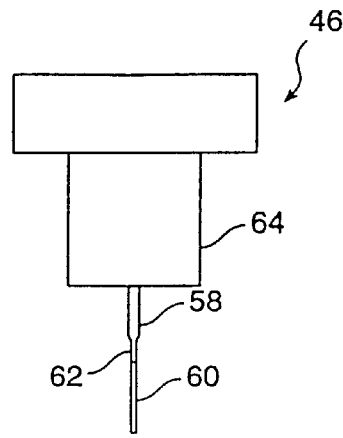
FIG. 3 is a side view of the removable tip wire holder according to a presently preferred embodiment of the present invention.

Tip holder 46 ("receiving means") according to a presently preferred embodiment of the present invention is depicted in detail in FIG. 3. A stainless steel tube 58 has its inner diameter slightly bigger than the diameter of wire 60 used for etching tips. In one embodiment, the wire 60 is fabricated from a platinum-iridium alloy, as is well known to those of ordinary skill in the art. The tip holding tube is crimped a small distance from its opening 62 so that a wire of fixed length inserted all the way up to the crimp in the tube will protrude by a fixed amount. The tube 58 is mounted on a stainless steel cylindrical rod 64 which is used for handling the wire throughout the manufacturing process. A Pt—Ir wire is precut to a fixed length, being somewhat greater than the depth of the opening in the tube 58. It is inserted into the tubing so that its end seats against the crimp.

Figure 4:
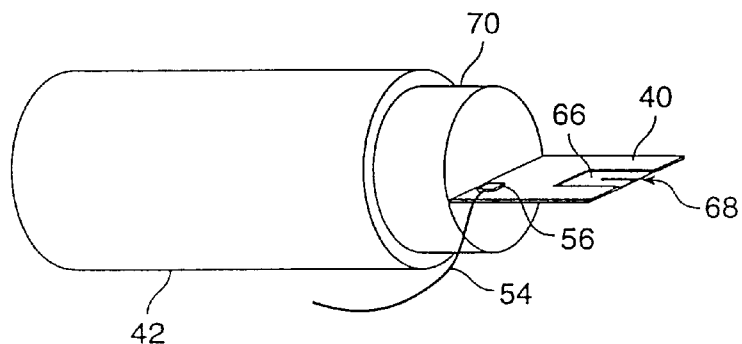
FIG. 4 is a perspective view of the tip-coating plate according to a presently preferred embodiment of the present invention.

Plate 40 as presently preferred is depicted in detail in FIG. 4. Plate 40 is preferably made from copper (or another thermally conductive material), and preferably has a wide, shallow slot 66 with a deep, narrow slot 68 that penetrates vertically through the entire plate from the center to the side, as shown. Plate 40 is attached to a copper block 70 which is fitted into a heating element 42. A temperature sensor 56 is preferably mounted on top of plate 40 close to the heating element 42 as shown. The temperature of plate 40 is regulated by temperature controller 48 (FIG. 2) in a well known manner.

Figure 5:
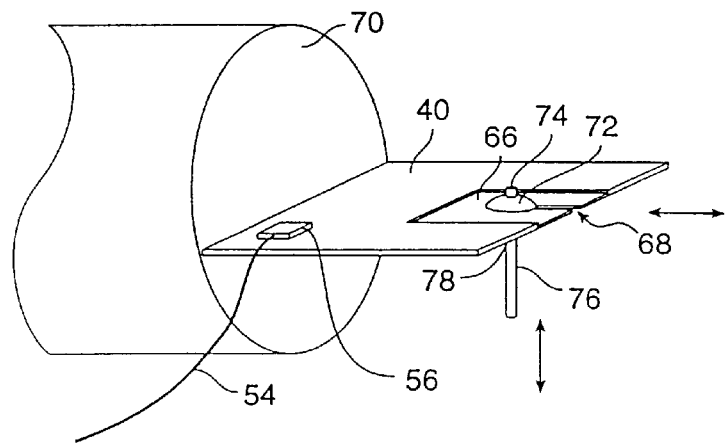
FIG. 5 is a view showing the use of the tip coating plate to coat a tip according to a presently preferred embodiment of the present invention.

Turning now to FIG. 5, in the preferred method of operation, a piece of polymer (or wax) material 72 which is used for coating tip 74 of wire 76 is placed on plate 40 in shallow slot 66. The polymer (or wax) 72 is then melted and kept at an optimum temperature with heating element 42 under control of temperature controller 48. This optimum temperature is determined by coating tips as outlined below. Too low a temperature will result in a solid wax or polymer deposit on top of the tip so that it will not conduct at all. Too high a temperature will result in exposure of too much metal so that the leakage current will be excessive. The user will have to determine an optimum temperature for a particular combination of coater, wire material, wire diameter and coating material. A micropositioner (50 in FIG. 2) is used to move plate 40 horizontally, aligning slot 68 on plate 40 with tip 74 and also moving plate 40 towards tip 74. As a result, tip 74 travels horizontally into slot 68 with its apex staying above the surface of the molten polymer (or wax) 72. After tip 74 is wetted by polymer 72, tip 74 is lowered into polymer 72 (which might instead be a wax such as Apiezon wax according to one presently preferred embodiment of the present invention) slowly by using the vertical adjustment (44 in FIG. 2) until it is completely immersed. Tip 74 is then brought up out of the wax or polymer 72 vertically by use of the vertical adjustment 44 so that molten wax or polymer is pulled up onto the shaft 78 of tip 74. After the desired length of coating along shaft 78 is achieved, tip 74 is moved back out of slot 68 horizontally.

The system, as described here, has been used to apply coatings of Apiezon wax, a tip-insulating material well known in prior art. Apiezon wax may be purchased from M & I Materials of Manchester, England. The same apparatus has also been used to apply coatings of other materials with beneficial results. Examples are polypropylene (PP) and high density polyethylene (HDPE). Both of these materials are chemically inert, do not dissolve in organic solvents, are more ductile and less brittle and thus less prone to cracking than is Apiezon wax. They also produce less contamination of the liquid into which tip 74 is immersed when imaging. The optimum temperature for coating each polymer needs to be determined empirically as described above, and, for low molecular weight materials, it is a strong function of the molecular weight of the polymer. If the temperature is set too high, both polymers will show signs of oxidizing (their color changes with time). This results in a brittle coating. If the temperature is too low, the molten polymer will not wet the platinum-iridium wire. For high molecular weight polypropylene, the optimum temperature has been determined to lie in the range of 160° C. to 180° C. by this method. For Apiezon wax, the range of about 160° C. to about 180° C. is presently preferred. For HDPE, the range of about 150° C. to about 170° C. is presently preferred.

As discussed above, the prior art for coating STM tips has made use of brittle non-ductile materials such as Poly($\alpha$-methylstyrene), glass and Apiezon wax. The inventors have discovered that ductile materials provide much more stable coatings, because they do not crack when the tip is stressed. A recognized and useful measure of ductility is called "elongation at break" or "EAB" which is, essentially, the percentage of stretch of a slab of material just prior to fracture. The information in the following table is reproduced from information selected from the Handbook of Plastics, Elastomers and Composites, C. A. Harper (Ed.), McGraw Hill, 1992.

TABLE I

| EAB (%) | Polymer |
| --- | --- |
| 3–4 | acrylonitrile |
| 4 | bisphenol epoxy |
| 1.2–2.5 | polystyrene |
| 1–2 | poly($\alpha$-methylstyrene) |
| 1–4 | phenolic |
| 30–100 | polyamide |
| 80–250 | ethylene vinyl alcohol |
| 200–300 | PTFE (Teflon ®) |
| 300–700 | Ionomer |
| 300–380 | polybutylene |
| 100–1000 | polyethylene |
| 100–600 | polypropylene |
| 20–700 | silicone |
| 200–450 | PVC (poly vinyl chloride) |

According to the present invention, it is desirable to use coating materials having an elongation at break of greater than or equal to about 20% (i.e., much higher than the first 5 entries of Table I). Such materials will be more ductile and will tend to crack less and thus leak less current. While some methods are described herein for coating tips with selected materials from the above TABLE I, it will be apparent to those of ordinary skill in the art that other methods may be used to coat tips including methods used in other industries for coating materials with the materials set forth in TABLE I.

In the preferred method of operation, a picoammeter is used to test the tip leakage current after coating. The typical leakage of a properly coated tip is less than 2 pA with 100 mV applied to the tip in 1 M NaCl solution. Tips with greater leakage currents may be discarded as defective. The parameters of the coating process (speed of movement of the tip through the molten polymer, temperature of the melt) are adjusted until this performance is obtained repeatedly. The whole coating procedure can be programmed and controlled automatically with motor driven components and a microprocessor controller (not shown) as is well known to those of skill in the art of instrument construction. Several tips may be coated at the same time by placing a number of tip holders and polymer coating stages on one translation apparatus.

THE ETCHER OPERATION

Figure 6:
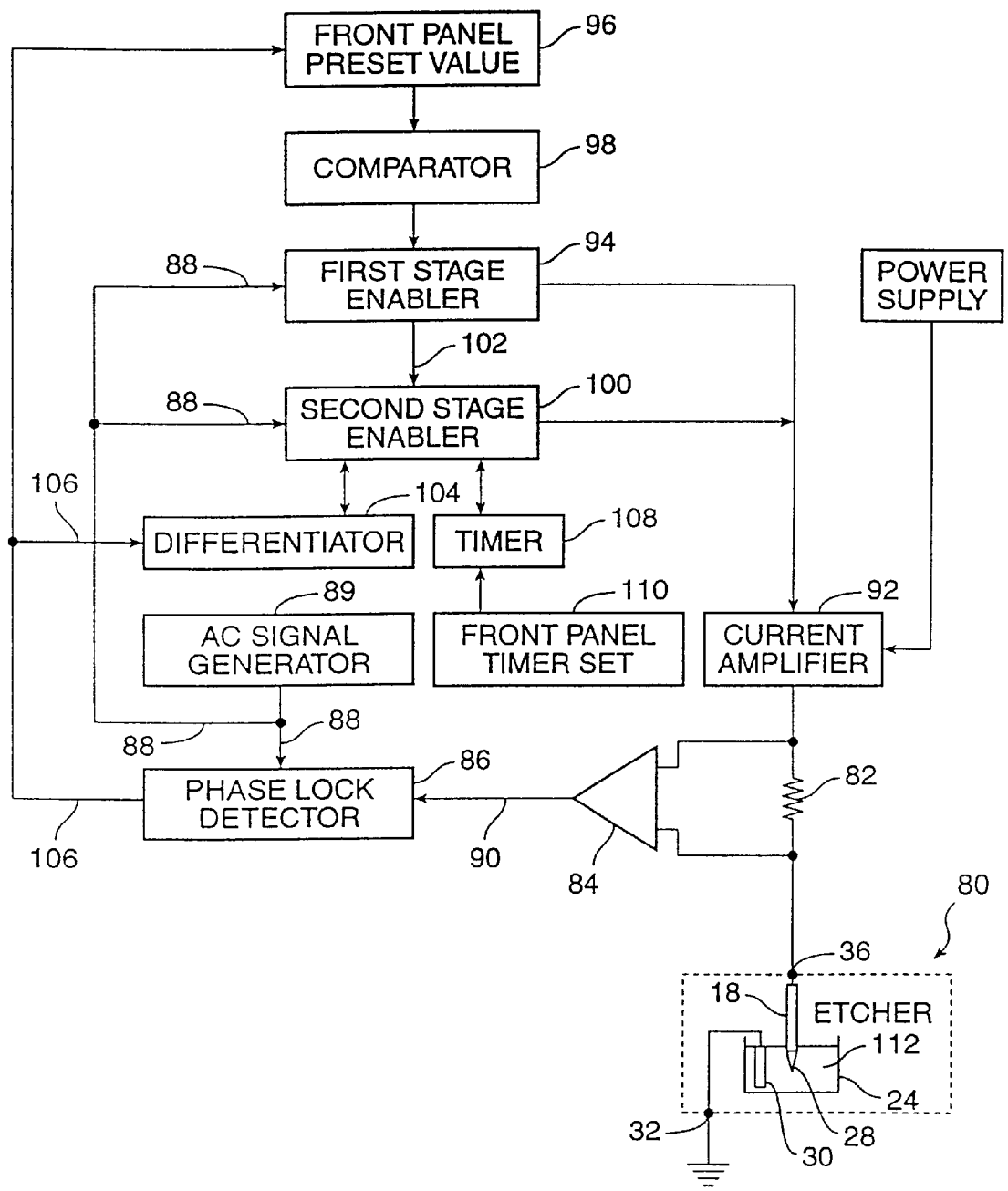
FIG. 6 is a schematic block diagram of the etch-control electronics system according to a presently preferred embodiment of the present invention.

The key ingredient in dispensing with the use of cyanide as a component of the etching electrolyte is the use of bipolar electrical pulses for etching. Here, we describe an etching circuit that provides suitable electrical pulses and also controls the etching process. A block diagram of the etch controller according to a presently preferred embodiment is set forth in FIG. 6. The current passing through the etching cell 80 is measured using a series resistor 82 connected across a differential amplifier 84. Unlike the prior art, this control unit uses a phase-locked circuit consisting of a phase-lock detector (analog multiplier) 86 (driven by the signal on line 88 from AC Signal Generator 89 used to pulse the current to tip 28) to detect the etching current signal on line 90 from differential amplifier 84. This use of synchronous detection results in much higher precision, because fluctuations in current that are not in-phase with the driving waveform are averaged to zero. The whole etching process is divided into two stages. The first stage is a quick etch, achieved by applying a large ac voltage to the etching bath. In the preferred embodiment, this is a 50 V peak to peak square wave at a frequency between 100 Hz and 500 Hz. It is applied by the current amplifier 92. The first stage of etching is terminated by the first stage enabler 94 when the output of phase-lock detector 86 falls below a preset value 96. First stage enabler 94 is a comparator. Preset value 96 is loaded using a front panel control and forms one input into comparator 98. The first stage enabler 94 then signals the second stage enabler 100 over line 102 which turns on the second stage of etching. Second stage enabler 100 is a comparator. The second stage is a much slower etch and is achieved using squarewave voltages between 3 V and 10 V peak to peak value at 100 Hz–500 Hz. The second stage is terminated when a differentiator 104 measures an abrupt decrease in the signal on line 106 from the phase-lock detector 86. In another embodiment, the second stage is terminated after a fixed time (i.e., a fixed time after the second stage begins) by a timer 108. According to this alternative embodiment, the duration of the second stage etch is set by a front panel controller 110 that sets the timer. In yet another embodiment, the second stage is terminated by either differentiator 104 or timer 108, depending upon which signal occurs first. Since the whole etching process may be fully automated, several tip wires can be etched at the same time with a multi-tip wire holders In this case, a separate controller is required for each tip circuit although a common etching bath 11 2 and counter electrode 30 may be used.

SUBSTRATE PREPARATION: ANNEALING OF GOLD

Prior art substrate preparation has relied upon preparation of substrates in an ultrahigh vacuum chamber with subsequent transfer and handling of the substrates in ultra-clean conditions. The present invention is a device and method for annealing a gold-on-mica substrate so that it is both clean and flat. An added advantage is that a substrate prepared in this way may be reused simply by repeating the annealing process described below. Therefore an end user need only be supplied with a substrate and the apparatus described in the present invention in order to be supplied with clean, new, flat surfaces for each imaging experiment.

Gold substrates are prepared by thermal evaporation of gold onto heated mica as described, for example, by J. A. DeRose et al. in "Comparative scanning probe microscopy study of the surface morphology of Au films grown from the vapor onto glass, fused silica, and muscovite mica", Journal of Vacuum Science and Technology A., Vol. 11, No. 4, pp. 776–780, July/August, 1993. The substrates may be stored and shipped in ambient conditions, because the annealing process of the present invention as described below produces an atomically clean surface even for a surface that was heavily contaminated prior to annealing.

Figure 7:
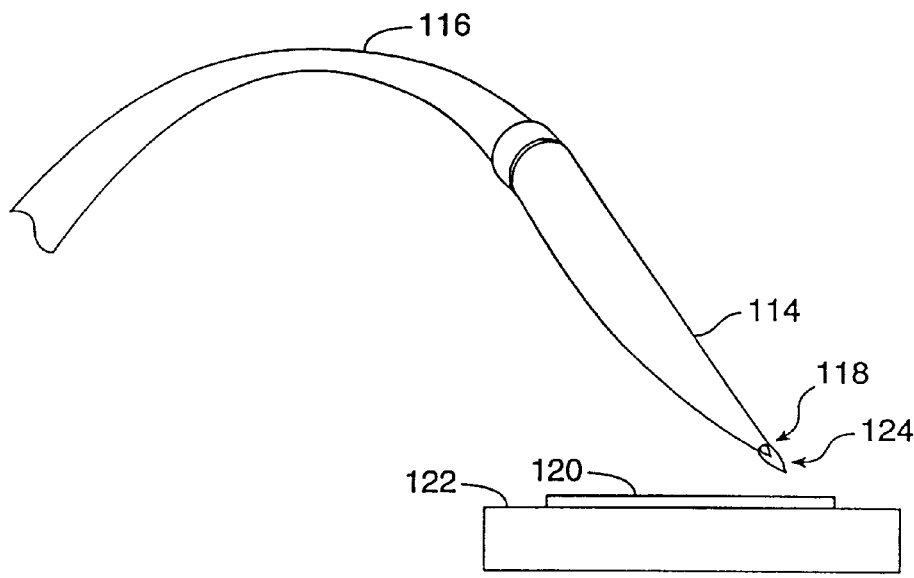
FIG. 7 is a diagram showing hydrogen-flame annealing of a substrate according to a presently preferred embodiment of the present invention.

Referring to FIG. 7, the annealing device consists of a quartz tube 114 connected to a low-pressure source of hydrogen gas via a feeder tube 116. A convenient source is a cylinder equipped with a low pressure regulator set to 5 or 10 psig. For safety, the gas is passed through a flash-back prevention valve before it is passed on to feeder tube 116. Quartz tube 114 is pulled down to a fine orifice 118 of about 0.5 mm diameter. The substrate 120 to be annealed is placed on a quartz plate 122 with the gold coated side facing up. For best results, the annealing procedure is carried out in a clean laminar flow hood. The fine hydrogen jet 124 from the end of the tube is ignited to produce a fine hydrogen-rich flame. In a darkened room, this is visible as a fine blue flame, and the hydrogen pressure should be adjusted so that the length of the flame is about 1 cm (as observed in the dark). The flame is held a little more than 1 cm above the surface of the gold and swept over the surface in a back and forth motion at a speed of about 5 cm/s. The surface is repeatedly swept for about 30 seconds after which the flame is withdrawn. The substrate is then immediately transferred to a sample holder and covered with clean electrolyte or clean, inert gas such as Argon. This procedure produces atomically clean surfaces with large, flat terraces, even if the substrate was substantially contaminated prior to the annealing. For this reason, a previously-used substrate can often be restored to atomic-scale cleanliness for re-use.

SUBSTRATE PREPARATION: FUNCTIONAL COUPLING

The utility of mica as a substrate for atomic force microscopy has been greatly enhanced by the use of chemical coupling agents such as the aminipropyltriethoxy silane (APTES) referred to in prior art [Y. L. Lyubchenko et al., Journal of Biomolecular Structure and Dynamics, supra]. However, what is needed is a multifunctional coupling agent; that is to say, an agent that binds to mica but that has an active headgroup that is easily substituted so as to tailor the reactivity of the resulting surface to have the desired properties for binding the sample. An example of such a general purpose reagent is iodopropyltriethoxysilane, $I(CH_2)_3Si(OCH_3)_3$ (IPTES). This reagent is similar to APTES, except that an iodine replaces the $NH_2$ found in APTES. The three hydrolyzable $CH_3O$ groups react with OH groups on the surface of mica to leave the alkyl-iodine complex on the surface. In the case of APTES, the hydrolyzable groups are $CH_3CH_2O$. Iodopropyltriethoxysilane belongs to a class of compounds of the form (O-alkyl)-Sialkyl-halide, and those skilled in the art will recognize that many equivalent compounds could be used.

Figure 8:
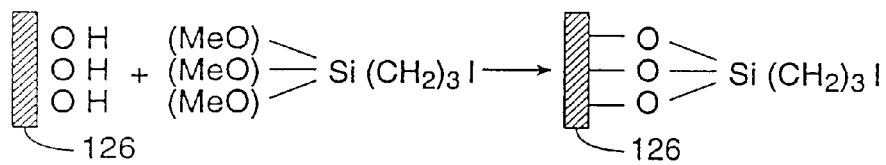
FIG. 8 is a diagram showing the scheme for modification of the mica surface with iodopropyltrimethoxysilane according to a presently preferred embodiment of the present invention.

The reaction of iodopropyltriethoxysilane with the mica surface is illustrated in FIG. 8. Here, the mica is represented by the shaded box 126 with only the surface OH groups shown. This reaction is similar to that of APTES with the mica surface, but it leaves a chemically reactive alkyl group on the surface. The surface is easily functionalized by reactions with this group. The IPTES-mica surface is referred to as I-mica.

It should be noted that any silicon (Si) containing surface is usually terminated in a high density of OH groups. This is true of silicon exposed to air, silicon nitride exposed to air and, of course, silicon dioxide (glass). These are all common materials used in the fabrication of force-sensing probes for atomic force microscopes, so the chemistry described herein works just as well for functionalizing AFM tips. This has important applications in designing AFM probe tips that are chemically sensitive by, for example, sensing changes in friction that occur as a result of the changes in chemical composition of a substrate over which the chemically active AFM tip is scanned.

Figure 9:
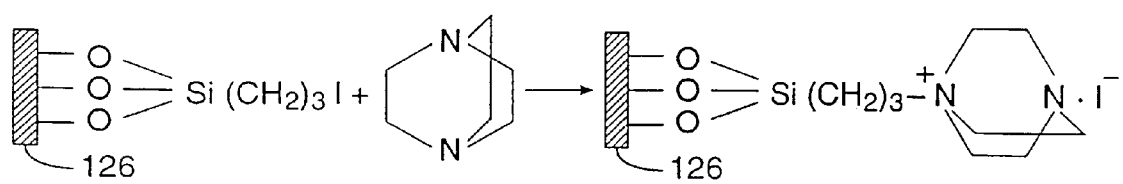
FIG. 9 is a diagram showing the scheme for attachment of 1,4-diazbicyclo [2,2,2] octane to a treated mica surface according to a presently referred embodiment of the present invention.

One example of the treatment of I-mica with a chemical to functionalize it further is the use of 1,4-diazabicyclo [2,2,2] octane (DABCO) can be reacted with I-activated mica as shown in FIG. 9. This modification leaves a quaternary amine on the surface. This moiety is positively charged over a very broad range of pH, from very acidic to highly alkaline. Surfaces modified in this way have yielded stable AFM images of DNA, double-stranded RNA, CAP protein, RNA polymerase and complexes of p25 protein with double stranded RNA. The reactivity of these surfaces is maintained over a wide range of pH and in the presence of various divalent ions. The reaction will work with any type of quaternary amine of the general form:

where R, R' and R" are alkyl or polyamine groups.

Figure 10:
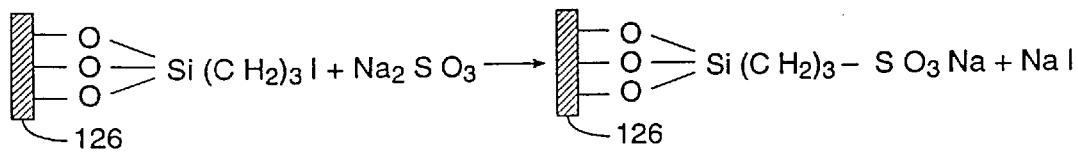
FIG. 10 is a diagram showing a scheme for reaction of a modified mica surface with sulfite according to a presently preferred embodiment of the present invention.

Preparation of a negatively charged surface may be achieved by reaction of I-mica with sulfonates. This is illustrated in FIG. 10 which shows the reaction of I-mica with $Na_2SO_3$ to produce a negatively charged sulfite-surface.

Figure 11:
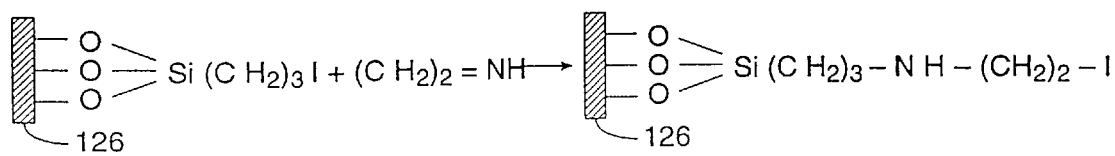
FIG. 11 is a diagram showing a scheme for reaction of a modified mica surface with ethylenimine according to a presently preferred embodiment of the present invention.

The surface of I-mica is intrinsically reactive, and will bind many molecules covalently. For example, it will react with the N-terminal amino groups of proteins, SH groups, and the N7 and N1 atoms of guanine and adenine respectively. The efficiency of this alkylation of bulky biological samples is often improved if a longer linker is used to attach the reactive group to the surface. An example of such a procedure is given in FIG. 11 which shows the use of ethylenimine to extend the length of the group holding the reactive site to the surface.

Figure 12A:
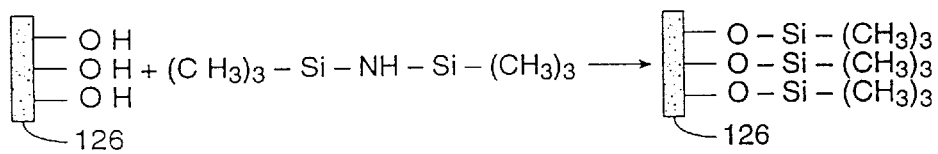
FIG. 12A is a diagram showing a scheme for reaction of a mica surface with 1,1,3,3,3-hexamethyldisilazane according to a presently preferred embodiment of the present invention.
Figure 12B:
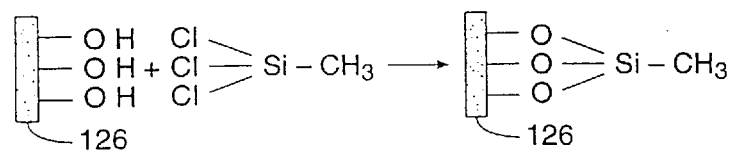
FIG. 12B is a diagram showing a scheme for reaction of a mica surface with $Cl_3$—Si—$CH_3$ according to a presently preferred embodiment of the present invention.

The intrinsically hydrophilic mica surface is rendered hydrophobic by treatment with an agent that methylates the surface. This is useful when the substrate must hold a hydrophobic sample (such as a membrane protein). A suitable reagent is 1,1,3,3,3-hexamethyidisilazane (HMDS). A mica surface treated with HMDS is referred to as H-mica. The reaction is illustrated in FIG. 12A which shows how surface OH groups are replaced by methyl groups using this reagent. Those skilled in the art will recognize that any reagent of the form alkyl-Si-alkyl may be used. An alternative is the use of reagents of the form halogen-Si-alkyl, because the halogen will also bind the mica surface. An example of such a reaction is shown in FIG. 12B.

The class of reagents described for modification of the mica surface are simple to use. Because of the hydrolytic nature of their interaction with the mica surface, it is essential that the reagents be kept free from contact with water vapor prior to use. Thus, either fresh preparations should be used, or the reagent should be redistilled under an inert gas (such as argon) and stored under inert gas until use. To that end, storage in a sealed bottle with a rubber septum for access by a syringe is convenient. Treatment of the mica is carried out by firstly cleaving the mica to expose a fresh surface. The mica is then placed in an argon-filled desiccator which contains a few drops of the reagent. The desiccator is sealed, and the mica left in the vapor atmosphere produced by the reagent (iodopropyltriethoxysilane or 1,1,3,3,3-hexamethyldisilazane or similar reagents). The mica is left in this atmosphere for several hours, after which it may be handled in an ordinary laboratory environment, either for further modification, or for application of the sample. Subsequent modification is achieved by treating the I-mica with a 1 mM solution of the appropriate reagent in an organic solvent such as ethanol.

In the case or reagents with a relatively high boiling point, such as iodopropyltriethoxysilane, the treatment of the mica surface must be carried out at an elevated temperature to increase the vapor pressure of the reagent. This is done by placing the desiccator in an oven and keeping it at about 80° C. while the mica is exposed to the vapor.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A tip coating system for coating a scanning tunneling microscope tip having a narrow end and a thick end of larger diameter than said narrow end, said system comprising:

receiving means for receiving and holding the thick end of the scanning tunneling microscope tip so as to leave the narrow end free and pointed up from the receiving means;

a plate positioned adjacent to said scanning tunneling microscope tip, said plate including a narrow slot penetrating a side of said plate and extending vertically through said plate for holding a coating material disposed at least in part over said slot;

a heater in contact with said plate for heating said plate and melting said coating material to form a molten blob of coating material disposed at least in part over said slot;

means for displacing said plate toward said scanning tunneling microscope tip so that the scanning tunneling microscope tip contacts said blob, through said slot of said plate, without the narrow end contacting the blob and for displacing said plate away from the scanning tunneling microscope tip so that the scanning tunneling microscope tip is free of said plate; and means associated with said receiving means for lowering the scanning tunneling microscope tip so that the narrow end contacts the blob and for raising the scanning tunneling microscope tip so that the narrow end no longer contacts the blob.

2. A tip coating system according to claim 1 wherein said coating material comprises wax.

3. A tip coating system according to claim 1 wherein said coating material comprises polypropylene.

4. A tip coating system according to claim 1 wherein said coating material comprises high density polyethylene.

5. A tip coating system according to claim 1 further comprising a temperature sensor disposed on said plate and a temperature controller connected to said temperature sensor and said heater to keep said plate at a predetermined temperature.

6. A tip coating system according to claim 5 wherein said predetermined temperature is between about 160° C. and about 180° C. when said coating material comprises wax.

7. A tip coating system according to claim 5 wherein said predetermined temperature is between about 150° C. and about 170° C. when said coating material comprises high density polyethylene.

8. A tip coating system for coating a scanning tunneling microscope tip having a first and second end, comprising:
   receiving means for holding the first end of the scanning tunneling microscope tip so as to leave the second end free and pointed away from the receiving means;
   a plate positioned adjacent to said scanning tunneling microscope tip, said plate having a slot penetrating a side of said plate and extending vertically through said plate for holding a coating material, said coating material disposed at least in part over said slot;
   a heater in contact with said plate for heating said plate and for melting said coating material to form a molten blob of coating material disposed at least in part over said slot;
   a means for displacing said plate toward the scanning tunneling microscope tip so that the scanning tunneling microscope tip is received by said slot of said plate and a portion of the scanning tunneling microscope tip that does not include the second end contacts said molten blob disposed at in part over said slot, said means for displacing capable of movement away from the scanning tunneling microscope tip; and
   a means associated with said receiving means for displacing said receiving means so that the second end of the scanning tunneling microscope tip is displaced into and out of said blob.

9. A tip coating system according to claim 8 wherein said coating material comprises wax.

10. A tip coating system according to claim 8 wherein said coating material comprises polypropylene.

11. A tip coating system according to claim 8 wherein said coating material comprises high density polyethylene.

12. A tip coating system according to claim 8 further comprising a temperature sensor disposed on said plate and a temperature controller connected to said temperature sensor and said heater to keep said plate at a predetermined temperature.

13. A method for coating a scanning tunneling microscope tip having a first and second end, comprising the steps of:
   providing a receiving means for holding the first end of the scanning tunneling microscope tip so as to leave the second end free and pointed away from the receiving means;
   providing a coating material;
   providing a plate having a slot penetrating a side of said plate and extending vertically through said plate for holding said coating material, said coating material disposed at least in part over said slot;
   providing a heater for heating said plate;
   melting said coating material using said heater to form a molten blob of coating material disposed at least in part over said slot;
   displacing said plate toward the scanning tunneling microscope tip so that the scanning tunneling microscope tip is received by said slot of said plate and so that a portion of the scanning tunneling microscope tip that does not include the second end contacts said molten blob disposed at in part over said slot; and
   displacing said receiving means so that the second end of the scanning tunneling microscope tip is displaced into and out of said molten blob.

14. A method for coating according to claim 13 wherein said provided coating material includes wax.

15. A method for coating according to claim 13 wherein said provided coating material includes polypropylene.

16. A method for coating according to claim 13 wherein said provided coating material includes high density polyethylene.

17. A method for coating according to claim 13 further including the step of providing a temperature sensor disposed on said plate and a temperature controller connected to said temperature sensor and said heater to keep said plate at a predetermined temperature.

* * * * *